Figure 1:
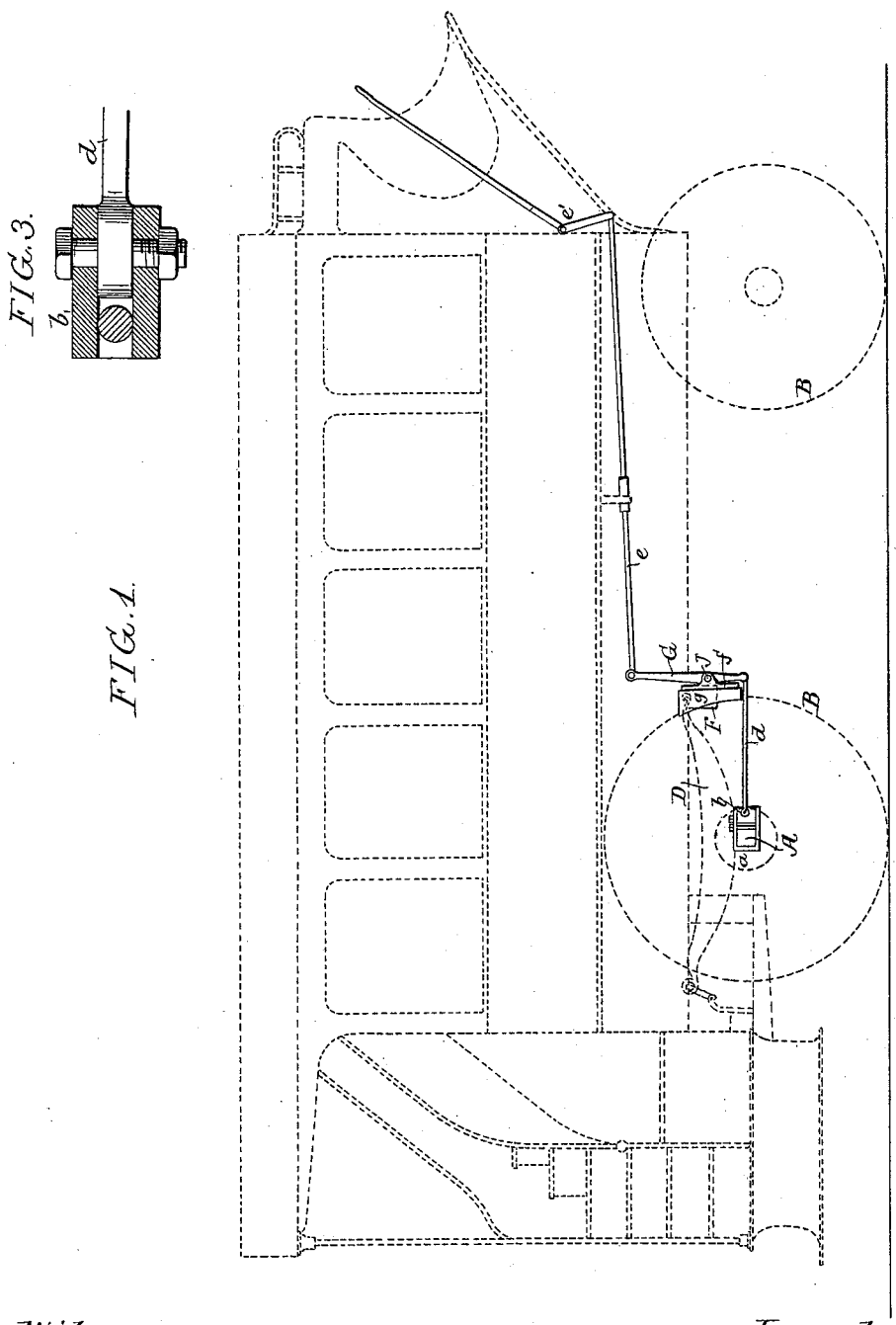

(No Model.) 2 Sheets—Sheet 1.

C. A. SHANK.
VEHICLE BRAKE.

No. 433,748. Patented Aug. 5, 1890.

Witnesses:
A. V. Groupe
Murray C. Boyer

Inventor
Charles A. Shank
by his Attorneys
Howson & Howson (No Model.) 2 Sheets—Sheet 2.
C. A. SHANK.
VEHICLE BRAKE.
No. 433,748. Patented Aug. 5, 1890.
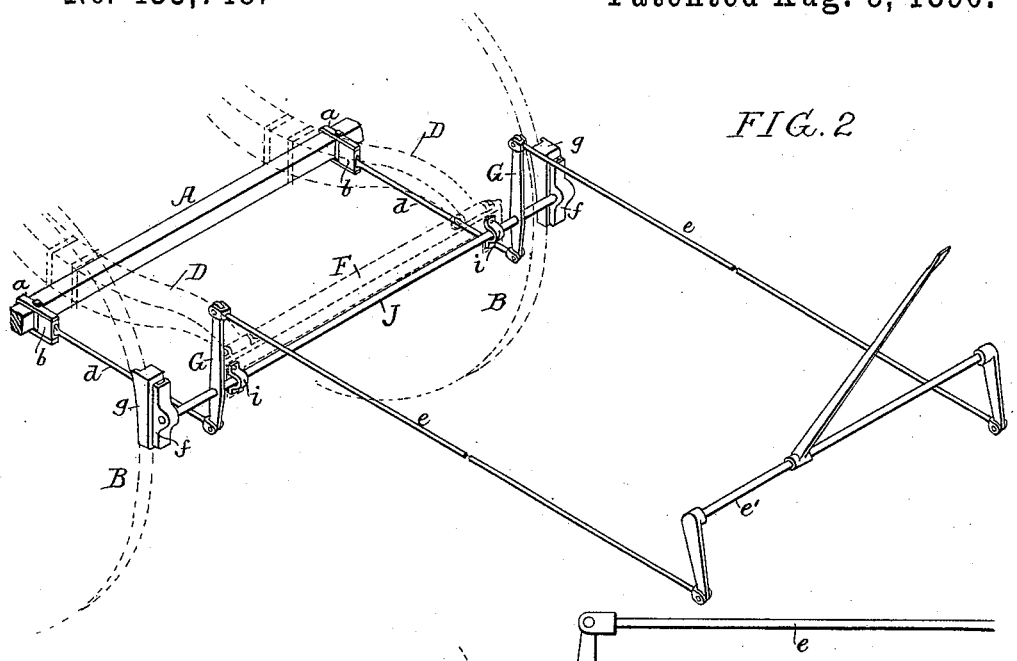
FIG. 2
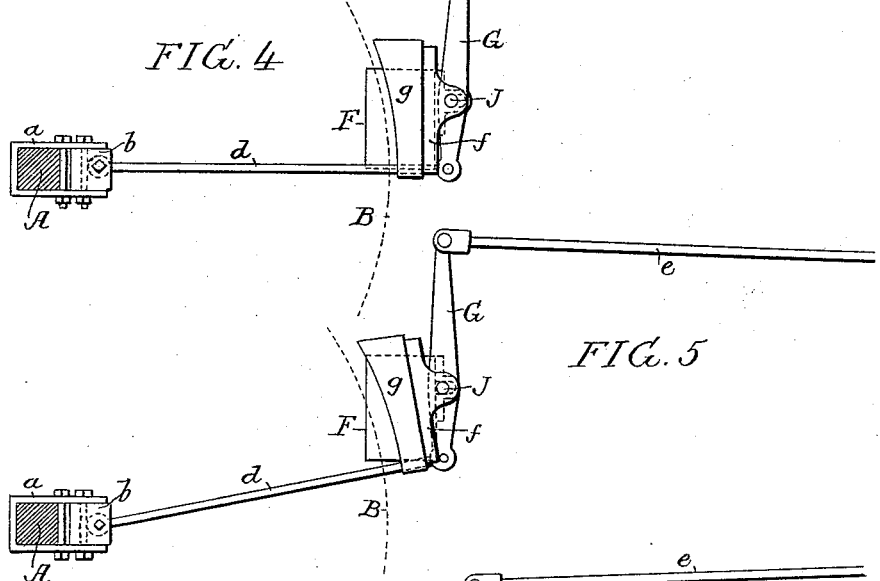
FIG. 4
FIG. 5
FIG. 6
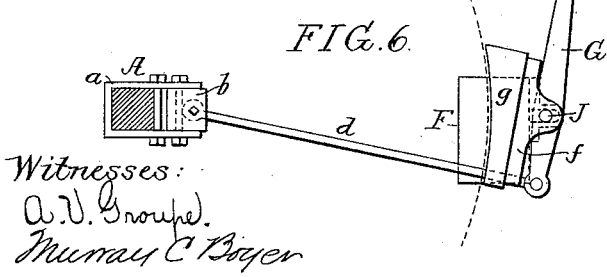
Witnesses:
A. V. Groupe
Murray C. Boyer
Inventor:
Charles A. Shank
by his Attorneys
Howson & Howson

UNITED STATES PATENT OFFICE.

CHARLES A. SHANK, OF PHILADELPHIA, PENNSYLVANIA, ASSIGNOR OF ONE-HALF TO BENJAMIN P. WILSON, OF SAME PLACE.

VEHICLE-BRAKE.

SPECIFICATION forming part of Letters Patent No. 433,748, dated August 5, 1890.

Application filed May 8, 1890. Serial No. 351,034. (No model.)

*To all whom it may concern:*

Be it known that I, CHARLES A. SHANK, a citizen of the United States, and a resident of Philadelphia, Pennsylvania, have invented certain Improvements in Brakes for Vehicles, of which the following is a specification.

My invention relates to that class of brakes for vehicles in which the brake rod or bar is carried by a spring-supported sill or other part of the frame on which the body is mounted, so that the brake rises and falls with the said spring-supported sill or frame, the object of my invention being to so mount the brake rod or bar and the brake-operating mechanism as to provide for the effective application of the brakes under all of the varying conditions as to load. This object I attain in the manner hereinafter set forth, reference being had to the accompanying drawings, in which—

Figure 1 is a side view of my improved braking mechanism, showing the coach body and wheels in dotted lines. Fig. 2 is a perspective view of the improved braking mechanism with the wheels and springs in dotted lines. Fig. 3 is a sectional plan view of part of the device, and Figs. 4, 5, and 6 are diagrams illustrating different positions of the brake.

A represents an axle of the vehicle; B B, the wheels mounted thereon, and D D springs, also mounted upon the axle and carrying a transverse sill or beam F, on which part of the body of the vehicle is mounted. To the axle, near each end of the same, is secured a clip $a$, which carries a recessed block $b$, and to the latter is hung a rod $d$, the front end of which is forked for the reception of the lower end of the brake-operating lever G, the upper end of the latter being connected by a rod $e$ and rock-shaft $e'$ to the foot-lever on the driver's platform or adjacent to the driver's seat.

The levers G carry the brake rod or bar J, and to the latter are secured the brake-blocks $f$, with detachable shoes $g$ for bearing upon the tires of the wheels B.

The brake rod or bar J passes through slotted bearings or brackets $i$ on the sill F, said brackets thus serving as vertical supports for the rod, but permitting free play of the same toward and from the peripheries of the wheels under the action of the brake-levers G.

The rods $d$, which carry the brake-levers G, are free to swing on their pivot-pins in the blocks $b$, and thus serve as radius-bars, and as the sill F rises and falls in accordance with the load these radius-bars cause the lower or fulcrum ends of the brake-levers to swing in the arcs of circles substantially equal to those of the peripheries of the wheels, so that the brake-shoes are at all times held in their proper normal position in respect to the wheels irrespective of the weight of the load and the vertical position of the brakes. (See Figs. 4, 5, and 6.)

If but one brake-lever G is used, the latter will be centrally located in respect to the brake-bar and the clip of the radius-rod $d$ will occupy a central position on the axle.

Having thus described my invention, I claim and desire to secure by Letters Patent—

1. The combination of the axle, a spring-supported sill or frame carrying the brake mechanism, and a brake-lever acting on the brake rod or bar and hung to a radius-bar pivoted close to the axle, said brake rod or bar being so located in respect to the pivot of the radius-bar that when the vehicle is light the radius-bar will have an upward inclination and when the vehicle is loaded said radius-bar will have a downward inclination, substantially as specified.

2. The combination of the axle, a spring-supported sill or frame, slotted bearings or brackets thereon, a brake rod or bar mounted in said brackets, so as to be free to move from and toward the wheel, a brake-lever, and a radius bar carrying said lever and pivoted to a bearing on the axle, the lever being so located in respect to the pivot of the radius-bar that when the vehicle is light the radius-bar will have an upward inclination and when the vehicle is loaded said bar will have a downward inclination, substantially as specified.

In testimony whereof I have signed my name to this specification in the presence of two subscribing witnesses.

CHAS. A. SHANK.

Witnesses:
EUGENE ELTERICH,
HARRY SMITH.